April 6, 1954

S. R. OVSHINSKY 2,674,331

AUTOMATIC STEERING CONTROL APPARATUS
FOR SELF-PROPELLED VEHICLES

Filed Jan. 23, 1952

INVENTOR
STANFORD R. OVSHINSKY
BY Roger B. McCormick
ATTORNEY

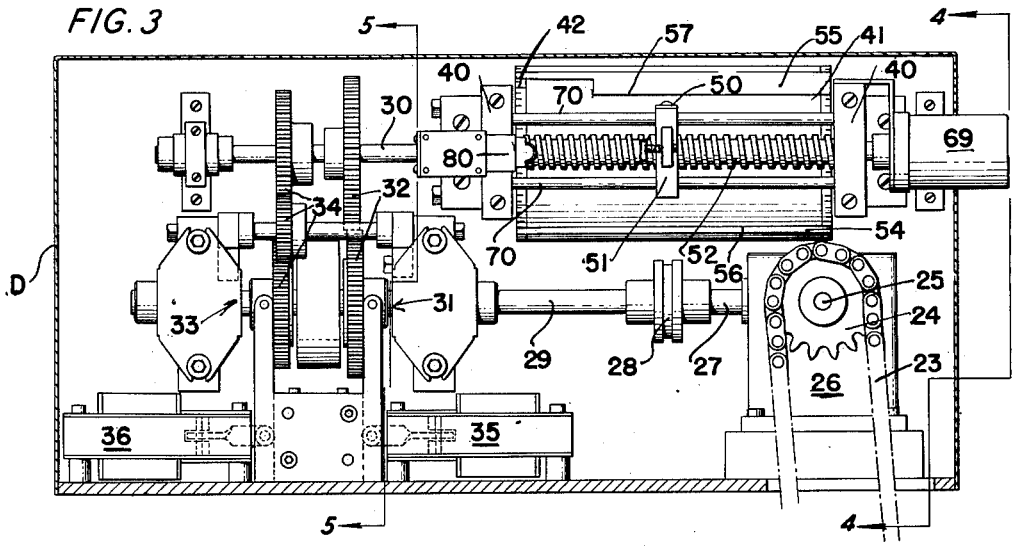

April 6, 1954     S. R. OVSHINSKY     2,674,331
AUTOMATIC STEERING CONTROL APPARATUS
FOR SELF-PROPELLED VEHICLES
Filed Jan. 23, 1952     3 Sheets-Sheet 3
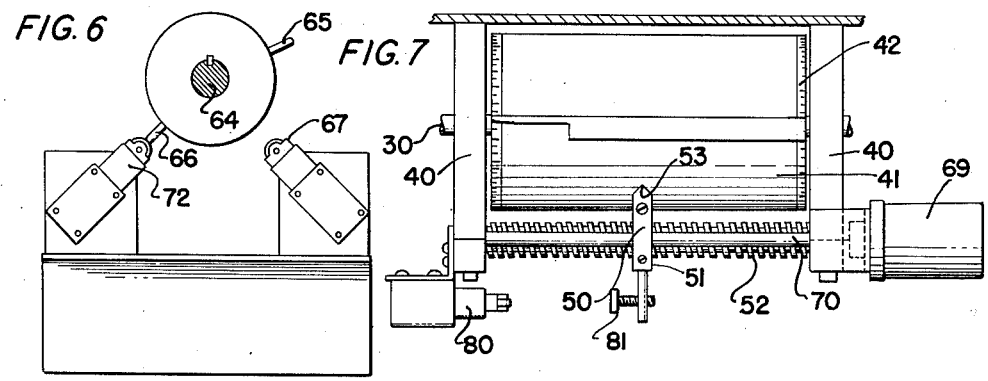
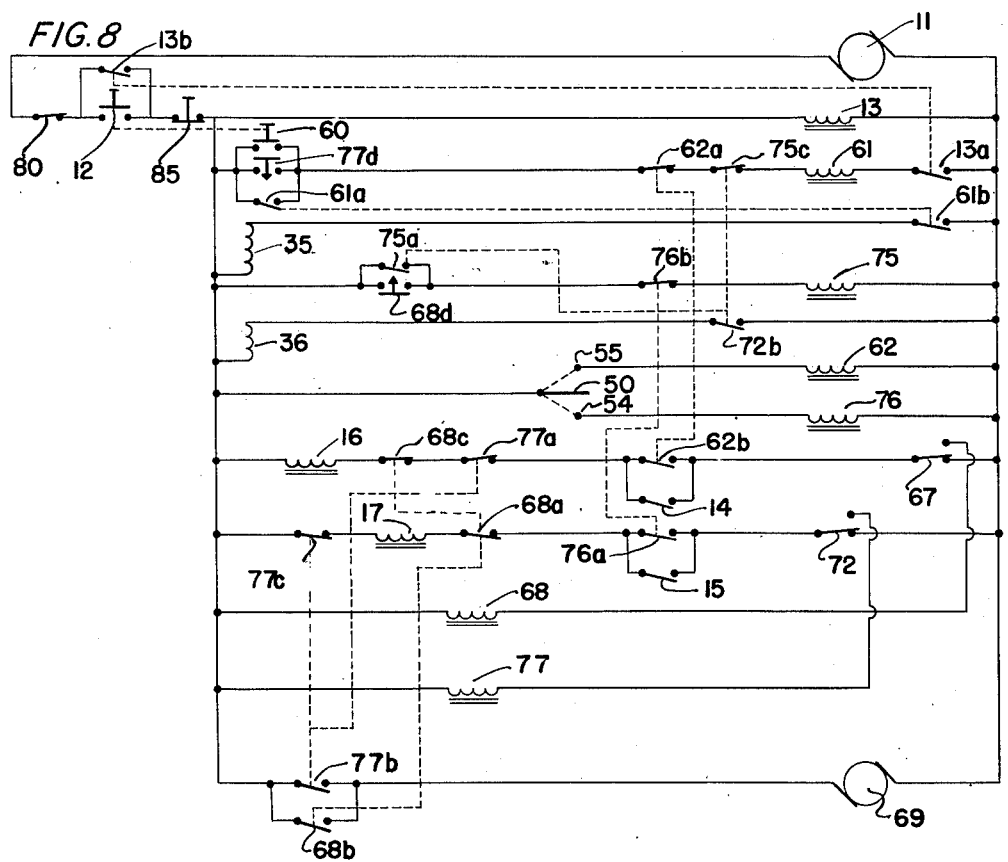
INVENTOR
STANFORD R. OVSHINSKY
BY Roger B. McCormick
ATTORNEY

Patented Apr. 6, 1954

2,674,331

UNITED STATES PATENT OFFICE 2,674,331

AUTOMATIC STEERING CONTROL APPARATUS FOR SELF-PROPELLED VEHICLES

Stanford R. Ovshinsky, New Britain, Conn.

Application January 23, 1952, Serial No. 267,865

15 Claims. (Cl. 180—79.1)

This invention relates to apparatus for automatically guiding or piloting a self-propelled vehicle.

It is the general aim of the invention to provide steering control apparatus which can be installed on conventional vehicles without requiring a major modification of the vehicle and which will be operable to pilot the vehicle over predetermined areas of operation and along preselected courses.

A more specific object is to provide a pilot or control unit for a vehicle operable to guide the vehicle along preselected courses, to turn the vehicle from one course to another at preselected locations, and to stop the vehicle after the same has completed its travel over a predetermined area.

A further object of the invention is to provide a control unit having the foregoing characteristics and which is entirely self-operated so as not to require remotely positioned operating or control means and so as not to require an attendant or operator after the vehicle has been started upon a cycle of operation.

Other objects and features will become apparent to those skilled in the art from the following description of the annexed drawings, which, by way of preferred example only, illustrate one specific embodiment of the invention.

In the drawings:

Fig. 3 is a side elevational view of the switch assemblage which is operable in response to movement of the tractor over a preselected distance to alter the course of the tractor;

Fig. 4 is a combined end and sectional view of the assemblage shown in Fig. 3 as indicated by the line 4—4 of Fig. 3;

Fig. 5 is a vertical sectional view through the assemblage as indicated by the line 5—5 of Fig. 3;

Fig. 6 is a transverse sectional view through the steering column of the tractor as shown by the line 6—6 of Fig. 1;

Fig. 7 is a top plan view of the switch control drum included in the assemblage shown in Fig. 3;

Fig. 8 is a wiring diagram for the steering control mechanism; and

Fig. 9 is a diagrammatic view of a field over which the tractor may be automatically piloted.

Figure 1:
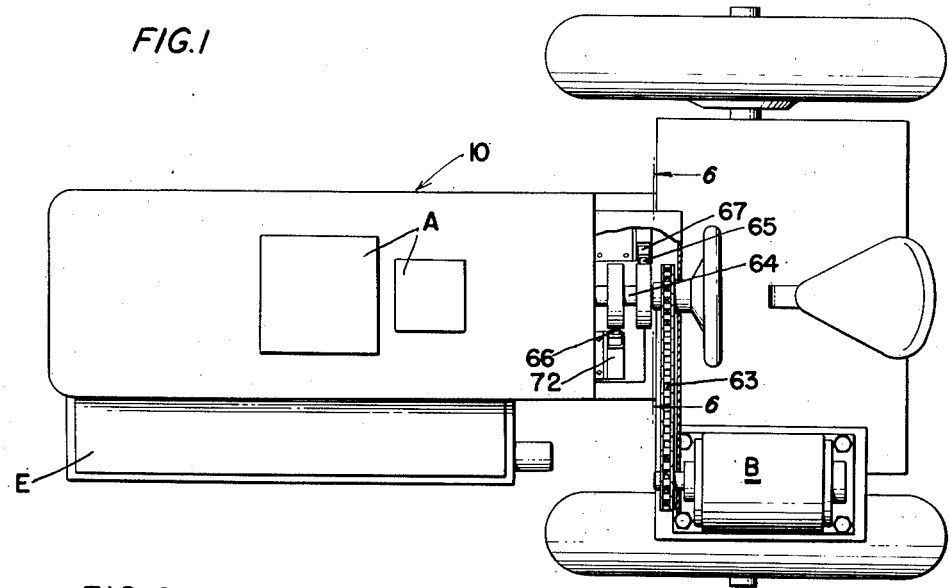
Fig. 1 is a plan view of a tractor upon which the automatic steering control mechanism of the present invention is installed.
Figure 2:
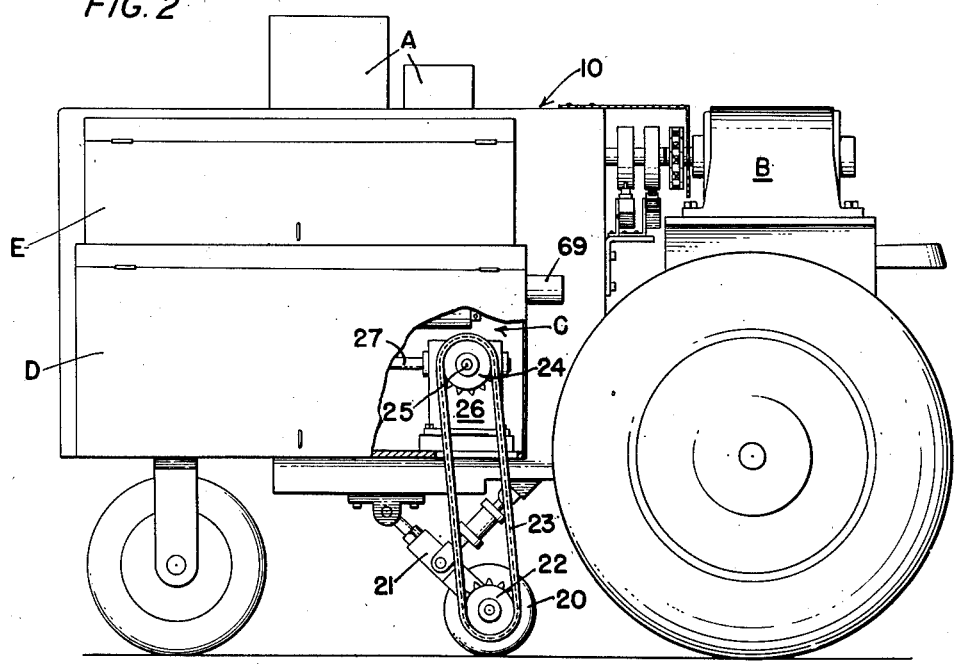
Fig. 2 is a side elevational view of the tractor shown in Fig. 1.

For purposes of illustration, the control apparatus of the present invention is shown mounted upon a conventional tractor 10. Let it be assumed that the tractor is to be utilized in the performance of an operation upon a field F (Fig. 9) wherein it is desired to automatically pilot the tractor from a starting position X to a finish position Y following the course indicated by the broken line. It will be seen that the tractor, from the position X, should be guided in a substantially straight course parallel to the lefthand boundary of the field until a position P, adjacent the upper end of the field, has been reached at which time the tractor should be turned 180° to the right. Thereafter the tractor should be headed toward the lower end of the field to a point P' and then turned 180° to the left. The same operational pattern should be followed until the field has been traversed from left to right and the tractor has arrived at position Y.

By way of background, it should be understood that the tractor is to be headed in the desired direction at the starting position X, the engine started, the control apparatus of the present invention started upon a cycle of operation, and then the tractor is to be clutched into movement to be automatically piloted over the outlined course to the finish position Y, at which position operation of the tractor is to be automatically stopped.

The automatic control or pilot apparatus of the present invention comprises generally a gyroscopic unit A for direction sensitive control of a steering motor B while the tractor moves across the field and a switch assemblage C for travel sensitive control of the motor B to effect the 180° turns at the upper and lower ends of the field. In the drawings the gyro unit A is shown mounted on top of the tractor hood, the steering motor B disposed to the side of the conventional driver's seat and the switch assemblage C is mounted within a housing D at one side of the engine. In addition, a control cabinet or panel E housing switches and relays utilized by the apparatus is disposed adjacent and above the housing D. It will be noted that with the apparatus mounted in the aforedescribed manner, the tractor can, if desired, be driven by an operator seated in the usual position.

In the following description of the control apparatus and its operation, there will be frequent references to the wiring diagram (Fig. 8) wherein there are shown schematic illustrations of conventional switches and relays and other elements utilized in the apparatus. Some of these elements are not otherwise shown nor specifically described since the details of their construction form no part of the present invention and since these elements are commercially available in many forms and models. For example, a conventional generator 11 (Fig. 8) driven by the tractor engine is utilized to furnish power for the control apparatus.

The generator is placed into circuit relation with the control apparatus when a start button 12 (disposed within the control cabinet or panel E) is closed by the operator to start the control apparatus upon a cycle of operation. Closing of the circuit by means of the button 12 energizes a relay 13 which causes the gyroscopic unit A to start operation. As will be seen in Fig. 8, the gyro relay 13 remains energized throughout the complete cycle of operation.

However, as previously mentioned, the gyro unit A is utilized to effect direction sensitive control of the reversible steering motor B only during the time the tractor crosses the field. Gyroscopic or direction sensitive operation is effected in a conventional manner, i. e., a gyroscope included in the unit is utilized to actuate servo means. In the present installation, the servo means comprise switches 14 and 15 (Fig. 8) which are selectively closed by the gyroscope to complete circuits between the generator 11 and relays 16 and 17, respectively. The relay 16 when energized will energize reversible steering motor B for a righthand turn and the relay 17 when energized will energize steering motor B for a lefthand turn. Accordingly, after the tractor has been properly headed at the starting position X and the gyro unit adjusted to correct to the tractor heading or to 180° of the heading in accordance with conventional practice, the tractor can be started into operation with every assurance that the tractor heading will be corrected to the proper course during travel of the tractor back and forth across the field. For example, if the tractor drifts toward the left the gyro will cause servo switch 14 to be closed thereby energizing relay 16 which causes steering motor B to effect a right turn back toward the proper heading and course. Thus the tractor will follow a substantially straight track across the field, being constantly corrected to the left and right by the gyro unit A.

The travel sensitive switch assemblage C is operated in response to movement of the tractor so as to be operable when the tractor reaches the points P or P' to control the steering motor B through a 180° turn to the right or left. The means for driving the switch assemblage in response to travel of the tractor includes a drive wheel 20 suspended by a conventional oleo support 21 beneath the tractor so as to ride upon the surface of the field. A sprocket 22 is corotatably mounted with the wheel 20 and by means of chain 23 drives a sprocket 24 fixed to the input shaft 25 of a conventional variable speed control unit 26.

An output shaft 27 from the unit 26 is connected by coupling 28 to drive shaft 29. The drive shaft 29 is adapted to be drivingly interconnected to driven shaft 30 for rotation thereof in one direction by a clutch unit 31 and gear train 32 or for rotation in the opposite direction by clutch unit 33 and gear train 34. The details of the clutch units 31 and 33 are not important to an understanding of the present invention, but it should be understood that said clutches are arranged to be selectively engaged by solenoids 35 and 36, respectively. For greater understanding of the invention let it be said that when solenoid 35 is energized the driven shaft 30 is rotated in a forward direction and when solenoid 36 is energized the driven shaft 30 is rotated in a reverse direction.

The driven shaft 30 is rotatably supported by brackets 40 within housing D and the shaft axially supports and rotates a switch control drum 41 fabricated from plastic or other nonconducting material.

As will be apparent from the foregoing description the drum 41 will be rotated when either of the clutches 31 or 33 are engaged and when the tractor is moving so that drive wheel 20 is turned. The amount of drum rotation of course depends upon the distances traveled by the tractor. The relationship between drum rotation and distance of travel can be preselected by manually adjusting or pre-setting the speed control unit 26. Accordingly, the drum can be provided with calibrations 42 corresponding to lineal measurements of tractor travel and the passage of said calibrations past a point of reference will serve to record the distance traveled by the tractor.

In order to record or make use of the travel information carried by the drum, an electric switch arm or probe 50 is used as the point of reference, the probe being carried by a nut 51 on threaded shaft 52 with its tip 53 engaging the periphery of the drum. A pair of electrical contact strips 54 and 55 are placed on the periphery of the drum so as to be engageable with the tip on the probe. The strips are cut to scale to conform to the upper and lower ends of the field F, the edge 56 on strip 54 conforming to a line drawn through the points P' on the field and the edge 57 on strip 55 conforming to a line through the points P. The strips are separated on the drum 41 a distance determined by the calibrations 42 corresponding to the lineal distances on the field F separating the points P and P'. When the tractor is in the starting position X the tip of probe 50 should engage the drum at the righthand end thereof adjacent the edge 56 on strip 54.

When the control circuit (Fig. 8) is closed by the start button 12 to energize the gyro relay 13, a normally open switch 13a in said relay is closed. The switch 13a is in circuit with a switch button 60 and relay 61 and the generator 11. The button 60 is arranged to close with button 12 whereupon relay 61 is energized by the generator. The relay 61 has one normally open switch 61a which is closed when the relay is energized. Relay 13 has a second normally open switch 13b which is closed upon energizing relay 13. Switches 13b and 61a shunt start buttons 12 and 60, respectively, from the circuit so that said buttons can be released to return to their normal open positions and the relays 13 and 61 will remain energized.

Relay 61 has a second normally open switch 61b connected in circuit with generator 11 and clutch solenoid 35, said switch being closed upon relay 61 becoming energized whereby clutch solenoid 35 will be energized to cause forward turning movement of the switch control drum 41 when the tractor is moved along the field. Upon clutching the tractor into forward movement from the starting position X, the drum will be rotated forwardly, or counterclockwise as viewed in Fig. 4, so that conductive strip 54 will move away from probe 50 and strip 55 will be moved toward engagement with the probe tip 53. Thus, during movement of the tractor across the field F, the probe 50 is out of engagement with the switch contact strips 54 and 55 as shown in Fig. 8.

When the tractor has traversed the field under steering control of the gyro and has arrived at the turning position P, the probe 50 will engage strip 55 placing relay 62 in circuit with generator 11. When relay 62 is energized a normally closed switch 62a therein will be opened and a normally open switch 62b will be closed. Switch 62a is in circuit with the generator 11 and relay 61 and when opened, relay 61 is de-energized causing the clutch solenoid 35 to be de-energized, thus stopping rotation of the switch control drum 41. Switch 62b is in circuit with relay 16 and when closed energizes said relay to excite steering motor B to effect a right turn of the tractor.

The steering motor B as shown in Fig. 1 is drivingly connected by chain and sprocket means 63 to the steering column 64 of the tractor whereby the steering column is turned to the right or left corresponding to rotation of the steering motor drive shaft. Adjustably fixed to the steering column 64 are a pair of dogs 65 and 66 engageable, respectively, with limit switches 67 and 72 (Fig. 6).

As above stated, the tractor will be turned to the right when probe 50 engages strip 55. The amount of right turn imparted to the steering column is limited by limit switch 67 which is engaged by dog 65 and shifted out of the normal position shown in Fig. 8 to a position wherein the motor relay 16 effecting the right turn is placed in closed circuit with a time delay relay 68 which is thereby energized by the generator 11.

The time delay relay 68 performs a plurality of functions. A principal function is to prevent the gyro unit from exercising steering control of the tractor. This function is performed by a normally closed switch 68a operated by the relay and in circuit with steering motor relay 17 which energizes the motor B for a left turn. The switch 68a is opened by the time delay relay 68 for the preselected time period to assure that the steering motor cannot be energized for a left turn by the gyro means until the 180° right turn has been completed. At the end of the time period switch 68a is closed permitting a left turn correction by the gyro unit at which time the 180° right turn will have been completed. Also during the time delay, the relay opens switch 68c in circuit with relay 16 to prevent right turning operation of the motor and steering column beyond the position where limit switch 67 is engaged.

A further function of the time delay relay 68 is to energize an indexing motor 69 which drives threaded shaft 52 to shift the nut 51 and probe 50 longitudinally of the indexing drum 41. As will be apparent from Figs. 3 and 7 probe 50 should be shifted along the drum to correspond to lateral positions assumed by the tractor at the completion of the 180° turns. To effect movement of the nut and probe from right to left along the drum, the nut is secured against rotation by guide bars 70 and the threaded shaft 52 is rotated as by the indexing motor 69. The means for energizing said motor comprises a switch 68b held closed by relay 68 during its time period, the switch 68b being in circuit with generator 11 and indexing motor 69. When the time period ends switch 68b opens and the probe 50 is disposed relative to the drum and conducting strips in a position corresponding to the position of the tractor relative to the field F at the completion of a 180° turn.

A fourth function of the time relay delay 68 occurs at the end of the time period. Then said relay closes a switch 68d connected in circuit with a relay 75 and the generator 11. The relay 75 when energized closes a holding switch 75a to maintain the circuit connection between the relay 75 and the generator after the switch 68c is opened. The relay 75 also closes a normally open switch 75b connected in circuit with generator 11 and clutch solenoid 36. At the same time a normally closed switch 75c is opened by the relay 75 de-energizing relay 61 thereby preventing energization of the clutch solenoid 35. As previously mentioned, clutch solenoid 36 engages clutch 33 to cause reverse rotation of the switch control drum 41. Therefore, as the tractor moves from the upper end of the field at the completion of the 180° right turn, the switch control drum 41 will be rotated in a reverse direction so as to move conductive strip 55 away from the probe 50 and to advance conductive strip 54 toward the probe 50. During said movement across the field from the upper end to the lower end thereof the gyroscopic unit A will exercise control of the steering motor B in the manner previously described.

When the tractor arrives at a position P' adjacent the lower end of the field the probe 50 will engage conductive strip 54 to place relay 76 (Fig. 8) in circuit relation with the generator 11. When relay 76 is energized it operates to close a normally open switch 76a to energize steering motor relay 17 to cause a left turn of the tractor. Relay 76 also operates to open a normally closed switch 76b in circuit with the relay 75 thereby causing clutch solenoid 36 to be de-energized and again neutralizing the drum or stopping rotation thereof.

The steering column of the tractor will be turned to the left under control of the relay 17 until the dog 66 on the tractor steering column 64 engages limit switch 72 which is shifted to a position (Fig. 8) placing time delay relay 77 in circuit relation with the relay 17 and the generator 11. The time delay relay 77 performs a plurality of functions one being to prevent the gyro unit from exercising steering control of the tractor while the same is being guided through a 180° left turn at the lower end of the field. This is accomplished by a normally closed switch 77a operated by the time delay relay 77 and in circuit with the steering motor relay 16. The switch 77a is opened by the time delay relay 77 for the preselected time period to assure that the steering motor cannot be energized for a right turn by the gyro means until the 180° left turn has been completed. Also during the time delay, switch 77c is opened in circuit with relay 17 to prevent further turning movement of the steering motor and steering column toward the left. At the end of the time period, switch 77a is closed permitting a right turn correction by the gyro unit at which time the 180° left turn has been completed.

Another function of the time delay relay 77 is to energize the probe indexing motor 69 during the time period. This is accomplished by closing a normally open switch 77b connected in circuit with the indexing motor 69 and the generator 11. The probe 50 is then shifted along the drum during the time period in the manner previously described in connection with the description of the operation of the time delay relay 68.

A fourth function of the time delay relay 77 occurs at the end of the time period when said relay closes a normally open switch 77d connected in circuit with the relay 61. The relay 61, as previously mentioned, when energized closes a holding switch 61a thereby permitting switch 77d to open. As described above, the relay 61 causes clutch solenoid 35 to become energized engaging clutch 31 so as to permit forward rotation of the switch control drum when the tractor moves across the field from the lower end to the upper end.

In summary then, the operation of the automatic steering control or pilot apparatus proceeds along the following lines. The tractor is aligned with the edge of the field in a starting position adjacent the lower end of the field and the tractor engine is started. Thereafter, the start button for the control apparatus is depressed to energize the gyro unit and to engage the switch control drum clutch to permit forward rotation of the drum when the tractor moves across the field. In movement across the field from the lower end to the upper end the gyro unit exercises steering control to pilot the tractor in a substantially straight line. When the tractor reaches a turning position adjacent the upper end of the field the switch control drum, which has rotated in response to movement of the tractor, causes engagement of switch means which start the tractor in a right turn and neutralizes the control drum. In the right turn of the tractor at the upper end of the field, a limit switch is closed to prevent gyroscopic control of the tractor for a preselected time period during which the tractor completes a 180° right turn. At the completion of the right turn switch means are operated to engage clutch means for reverse movement of the control drum and to reinstate steering control in the gyroscopic unit. The tractor then moves toward the lower end of the field and the aforedescribed cycle of operation is repeated.

Thus, the tractor is automatically piloted over the field until the same arrives at the finish position Y. At the finish position, the control apparatus operates switch means to shut off the tractor ignition and to open the circuit to the control apparatus whereby the tractor will remain standing in the finish position. Said switch means comprises a limit switch 80 (Figs. 3, 7 and 8), which is engageable by an adjustable bolt 81 carried by the probe nut 51. As previously mentioned, the nut and probe are indexed longitudinally along the control drum from right to left as viewed in Figs. 3 and 7 and when the tractor reaches a position on the righthand side of the field the bolt 81 will engage limit switch 80 to open the same and as previously mentioned, switch means operable by said limit switch can be utilized to cut the tractor ignition.

A manually operable normally closed switch 85 is included in the control circuit (Fig. 8) to be operated in case of emergency to open the control circuit and prevent further operation of the automatic control apparatus. It is contemplated that this switch will be utilized by the attendant in testing the operation of the control apparatus.

It should be understood from the foregoing description that there is provided in accordance with the present invention control apparatus for automatically guiding or piloting a vehicle such as a tractor over preselected courses throughout a predetermined area of operation. It will be advisable in most instances to survey the area of operation quite carefully. For example, a farmer operating a tractor in a field such as the field illustrated in Fig. 9 should carefully survey the dimensions of his field so that the contact members 54 and 55 can be accurately fabricated and assembled on the switch control drum 41 to assure accuracy in steering control of the tractor throughout the cycle of operation.

It should be also understood that the aforedescribed mechanism includes elements which can be replaced by equivalents without diminishing the operational characteristics of the control apparatus. For example, the reversible steering motor B can be replaced by a constantly operating motor having clutch means engageable to effect right or left turning movement of the steering column. It is also contemplated that the steering motor can be eliminated and power means drivingly connected to the tractor steering column, the power means to be driven from the tractor engine as for example by a belt and pulley arrangement connected to the tractor drive shaft. As a further example, the generator 11 utilized to supply the power to the control apparatus can be replaced by a battery to supply electrical energy to the system. As a still further example, the illustrated drive for the control drum may be replaced by drive means operated from the tractor drive shaft.

Furthermore, it should be understood that the relays incorporated in the control apparatus can be utilized to operate switches for actuating the hydraulic controls, etc. of agricultural implements driven by the tractor through the field and it should be further understood that the control apparatus of the present invention can be utilized to pilot the tractor or other vehicle through preselected courses which differ from the exemplary course shown in Fig. 9.

I claim as my invention:

1. An automatic pilot for a self-propelled vehicle comprising in combination, a source of electrical energy, electrically operable drive means connected to the steering apparatus of the vehicle and adapted to turn the vehicle in either direction, conductor means interconnecting said source and said drive means, a direction sensitive control unit including a gyroscope and servo means actuated thereby, said servo means being electrically connected to said conductor means and adapted to selectively energize the drive means for right and left turns in response to deviations of the vehicle from a preselected heading, a travel sensitive control unit including switch means connected to said conductor means, said switch means being adapted when closed to electrically disconnect said servo means and to energize said drive means for a turn in one direction, and said travel sensitive control unit also including motion transmitting means operatively connected to said switch means and adapted to close said switch means in response to movement of the vehicle over a preselected distance.

2. An automatic pilot for a self-propelled vehicle comprising in combination, a source of electrical energy, electrically operable drive means connected to the steering apparatus of the vehicle and adapted to turn the vehicle in either direction, conductor means interconnecting said source and said drive means, a direction sensitive control unit including a gyroscope and servo means actuated thereby, said servo means comprising switch means connected to said conductor means and adapted to selectively energize the drive means for right and left turns in response to deviations of the vehicle from a preselected heading, a travel sensitive control unit including a switch connected to said conductor means, said switch being adapted when closed to electrically disconnect said servo switch means and to energize said drive means for a turn in one direction, and said travel sensitive control unit also including motion transmitting means operatively connected to said switch and adapted to close said switch in response to movement of the vehicle over a preselected distance.

3. An automatic pilot for a self-propelled vehicle comprising in combination, a source of electrical energy, a reversible electrical motor connected to the steering apparatus of the vehicle to selectively turn the same in either direction, conductor means interconnecting said source and said motor, a direction sensitive control unit including a gyroscope and a plurality of servo switches actuated thereby, said servo switches being connected in circuit with said conductor means and adapted to selectively energize said motor for right and left turns in response to deviations of the vehicle from a preselected heading, a travel sensitive control unit including switch means connected in circuit with said conductor means, said switch means being adapted when closed to electrically disconnect said servo switches and to energize said motor for a turn in one direction, and said travel sensitive control unit also including motion transmitting means operatively connected to said switch means and adapted to close said switch means in response to movement of the vehicle over a preselected distance.

4. An automatic pilot for a self-propelled vehicle comprising in combination, a source of electrical energy, a reversible electrical motor connected to the steering apparatus of the vehicle to selectively turn the same in either direction, conductor means interconnecting said source and said motor, a direction sensitive control unit including a gyroscope and a plurality of servo switches actuated thereby, said servo switches being connected in circuit with said conductor means and adapted to selectively energize said motor for right and left turns in response to deviations of the vehicle from a preselected heading, a travel sensitive control unit including switch means connected in circuit with said conductor means, said switch means being adapted when closed to electrically disconnect said servo switches and to energize said motor for a turn in one direction, said switch means including a first contact, a second contact, movable support means for said first contact, and motion transmitting means included in said travel sensitive control unit operatively connected to said support means and adapted to advance said support means toward said second contact in response to movement of the vehicle.

5. An automatic pilot for a self-propelled vehicle comprising in combination, a source of electrical energy, a reversible electrical motor connected to the steering apparatus of the vehicle to selectively turn the same in either direction, conductor means interconnecting said source and said motor, a direction sensitive control unit including a gyroscope and a plurality of servo switches actuated thereby, said servo switches being connected in circuit with said conductor means and adapted to selectively energize said motor for right and left turns in response to deviations of the vehicle from a preselected heading, a travel sensitive control unit including switch means connected in circuit with said conductor means and adapted when closed to electrically disconnect said servo switches and to energize said motor for a turn in one direction, said switch means including a first contact, a rotatable drum mounted adjacent said first contact, a second contact mounted on said drum and engageable with said first contact, and means included in said travel sensitive control unit adapted to close said contacts in response to movement of the vehicle over a preselected distance, said last mentioned means including a drive wheel rotatably supported by the vehicle in engagement with the ground and motion transmitting means interconnecting said drive wheel and said drum.

6. An automatic pilot for a self-propelled vehicle comprising in combination, a source of electrical energy, electrically operable drive means connected to the steering apparatus of the vehicle and adapted to turn the vehicle in either direction, conductor means interconnecting said source and said drive means, a direction sensitive control unit including a gyroscope and a plurality of servo switches actuated thereby, said servo switches being connected in circuit with said conductor means and adapted to selectively energize said drive means for right and left turns in response to deviations of the vehicle from a preselected heading, a travel sensitive control unit including switch means connected in circuit with said conductor means and adapted when closed to electrically disconnect said servo switches and to energize said drive means for a turn in one direction, motion transmitting means included in said travel sensitive control unit and adapted to close said switch means in response to movement of the vehicle over a preselected distance, and limit switch means engageable by the steering apparatus during a turn in said one direction, said limit switch means being connected in circuit with said conductor means and adapted to electrically disconnect said switch means and to re-establish electrical connection of said servo switches.

7. An automatic pilot for a self-propelled vehicle comprising in combination, a source of electrical energy, a reversible electric motor connected to the steering column of the vehicle to selectively turn the vehicle in either direction, conductor means interconnecting said source and said motor, a direction sensitive control unit including a gyroscope and a plurality of servo switches actuated thereby, said servo switches being connected in circuit with said conductor means and adapted to selectively energize said motor for right and left turns in response to deviations of the vehicle from a preselected heading, a travel sensitive control unit including switch means connected in circuit with said conductor means and adapted when closed to electrically disconnect said servo switches and to energize said motor for a turn in one direction, motion transmitting means included in said travel sensitive control unit and adapted to close said switch means in response to movement of the vehicle over a preselected distance, and limit switch means arranged for actuation by the steering column during a turn in said one direction, said limit switch means being connected in circuit with said conductor means and adapted to electrically disconnect said switch means and to re-establish electrical connection of said servo switches.

8. An automatic pilot for a self-propelled vehicle comprising in combination, a source of electrical energy, a reversible electric motor connected to the steering column of the vehicle to selectively turn the vehicle in either direction, conductor means interconnecting said source and said motor, a direction sensitive control unit including a gyroscope and a plurality of servo switches actuated thereby, said servo switches being connected in circuit with said conductor means and adapted to selectively energize said motor for right and left turns in response to deviations of the vehicle from a preselected heading, a travel sensitive control unit including switch means connected in circuit with said conductor means and adapted when closed to electrically disconnect said servo switches and to energize said motor for a turn in one direction, said switch means including a first contact, a rotatable drum mounted adjacent said first contact, a second contact mounted on said drum and engageable with said first contact, means included in said travel sensitive control unit adapted to close said contacts in response to movement of the vehicle over a preselected distance, said means comprising a drive wheel rotatably supported by the vehicle in engagement with the ground and motion transmitting means interconnecting said drive wheel and said drum, and limit switch means arranged for actuation by the steering column during a turn in said one direction, said limit switch means being connected in circuit with said conductor means and adapted to electrically disconnect said switch means and to re-establish electrical connection of said servo switches.

9. Automatic control means for the steering apparatus of a self-propelled vehicle comprising a source of electrical energy, electrically operable drive means connected to the steering apparatus and operable to turn the vehicle, conductor means interconnecting said source and said drive means, a control switch connected in circuit with said conductor means and adapted when closed to energize said drive means, said control switch including a movable member having calibrations corresponding to lineal measurements of vehicle travel and adjustably supporting a first switch contact with reference to the said calibrations, a second switch contact supported for engagement by said first contact, control switch actuating means including drive means responsive to lineal movement of the vehicle, and motion transmitting means interconnecting said last mentioned drive means and said movable member and adapted to advance said first contact toward said second contact during lineal movement of the vehicle whereby said control switch is closed in response to movement of the vehicle over a preselected distance.

10. Automatic control means for the steering apparatus of a self-propelled vehicle comprising a source of electrical energy, electrically operable drive means connected to the steering apparatus and operable to turn the vehicle, conductor means interconnecting said source and said drive means, a control switch connected in circuit with said conductor means and adapted when closed to energize said drive means, said control switch comprising a drum rotatably mounted on the vehicle, a first contact adjustably supported on the periphery of said drum, a second contact supported by the vehicle adjacent the periphery of said drum for engagement by said first contact, control switch actuating means including drive means responsive to lineal movement of the vehicle, and motion transmitting means interconnecting said last mentioned drive means and said drum for rotation of the drum during lineal movement of the vehicle whereby said control switch is closed in response to movement of the vehicle over a preselected distance.

11. Automatic control means for the steering apparatus of a self-propelled vehicle comprising a source of electrical energy, electrically operable drive means connected to the steering apparatus and operable to turn the vehicle, conductor means interconnecting said source and said drive means, a control switch connected in circuit with said conductor means and adapted when closed to energize said drive means, said control switch comprising a drum rotatably mounted on the vehicle and provided with circumferentially spaced calibrations corresponding to lineal measurements of vehicle travel, a first contact supported by the drum in adjusted positions relative to said calibrations, a second contact supported by the vehicle adjacent the periphery of said drum for engagement by said first contact, control switch actuating means including drive means responsive to lineal movement of the vehicle, and motion transmitting means interconnecting said last mentioned drive means and said drum for rotation of the drum during lineal movement of the vehicle whereby said control switch is closed in response to movement of the vehicle over a preselected distance.

12. Automatic control means for the steering apparatus of a self-propelled vehicle comprising a source of electrical energy, electrically operable drive means connected to the steering apparatus and operable to turn the vehicle, conductor means interconnecting said source and said drive means, a control switch connected in circuit with said conductor means and adapted when closed to energize said drive means, said control switch comprising a drum rotatably mounted on the vehicle and provided with circumferentially spaced calibrations corresponding to lineal measurements of vehicle travel, a first contact supported by the drum in adjusted positions relative to said calibrations, a second contact supported by the vehicle adjacent the periphery of said drum for engagement by said first contact, control switch actuating means including a drive wheel rotatably supported by the vehicle in engagement with the ground, and motion transmitting means interconnecting said drive wheel and said drum for rotation of the drum during lineal movement of the vehicle whereby said control switch is closed in response to movement of the vehicle over a preselected distance.

13. Automatic control means for the steering apparatus of a self-propelled vehicle comprising a source of electrical energy, electrically operable drive means connected to the steering apparatus and operable to turn the vehicle, conductor means interconnecting said source and said drive means, a control switch connected in circuit with said conductor means and adapted when closed to energize said drive means, said control switch comprising a drum rotatably mounted on the vehicle and provided with circumferentially spaced calibrations corresponding to lineal measurements of vehicle travel, a first contact supported by the drum in adjusted positions relative to said calibrations, a second contact supported by the vehicle adjacent the periphery of said drum for engagement by said first contact, control switch actuating means including drive means responsive to lineal movement of the vehicle, motion transmitting means interconnecting said last mentioned drive means and said drum, first electrically operable clutch means included in said motion transmitting means adapted when engaged to rotate said drum in one direction thereby to engage said contacts, second electrically operable clutch means included in said motion transmitting means adapted when engaged to rotate said drum in the opposite direction, conductor means interconnecting said source and said first and second clutch means, switch means included in said last mentioned conductor means operable when said contacts are closed to disengage said first clutch means, and a limit switch included in said last mentioned conductor means operable by the steering apparatus during a turn of the vehicle to engage said second clutch means.

14. Automatic control means for the steering apparatus of a self-propelled vehicle comprising a source of electrical energy, an electric motor connected to the steering apparatus to turn the vehicle, conductor means interconnecting said source and said motor, a control switch included in said conductor means and adapted when closed to energize said motor, said control switch comprising a drum rotatably mounted on the vehicle, a first contact adjustably supported by said drum, a second contact supported by the vehicle for engagement by said first contact, control switch actuating means including a drive wheel rotatably supported by the vehicle in engagement with the ground, motion transmitting means interconnecting said drive wheel and said drum, a first electrically operable clutch included in said motion transmitting means adapted when engaged to effect rotation of said drum in one direction thereby to engage said contacts, a second electrically operable clutch included in said motion transmitting means adapted when engaged to effect rotation of said drum in the opposite direction, conductor means interconnecting said source and said first and second clutches, switch means included in said last mentioned conductor means operable when said contacts are closed to disengage said first clutch, and a limit switch included in said last mentioned conductor means arranged for actuation by the steering apparatus during a turn of the vehicle and adapted to engage said second clutch.

15. Automatic control means for the steering apparatus of a self-propelled vehicle comprising a source of electrical energy, an electric motor connected to the steering apparatus to turn the vehicle, conductor means interconnecting said source and said motor, a control switch included in said conductor means and adapted when closed to energize said motor, said control switch including a drum rotatably mounted on the vehicle, and provided with circumferentially spaced calibrations corresponding to lineal measurements of vehicle travel, a first contact comprising an elongated conductive strip adjustably supported by the drum longitudinally thereof, a lead screw rotatably supported by the vehicle adjacent and parallel to said drum, a second contact adjustably carried by said lead screw for engagement by said first contact, control switch actuating means including a drive wheel rotatably supported by the vehicle in engagement with the ground, motion transmitting means interconnecting said drive wheel and said drum, a first electrically operable clutch included in said motion transmitting means adapted when engaged to effect rotation of said drum in one direction thereby to engage said contacts, a second electrically operable clutch included in said motion transmitting means adapted when engaged to effect rotation of said drum in the opposite direction, conductor means interconnecting said source to said first and second clutches, switch means included in the last mentioned conductor means operable when said contacts are closed to disengage said first clutch, a limit switch included in the last mentioned conductor means arranged for actuation by the steering apparatus during a turn of the vehicle and adapted to engage said second clutch, electrically operable drive means connected to said lead screw, and conductor means including switch means interconnecting said source and said drive means, said last mentioned switch means being operable when said limit switch is actuated to energize said drive means thereby to move said second contact along said lead screw.

References Cited in the file of this patent

UNITED STATES PATENTS

| Number | Name | Date |
|---|---|---|
| 1,570,547 | Avera | Jan. 19, 1926 |
| 2,074,251 | Braun | Mar. 16, 1937 |
| 2,176,469 | Moueix | Oct. 17, 1939 |
| 2,317,400 | Paulus et al. | Apr. 27, 1943 |
| 2,321,874 | Tandler et al. | June 15, 1943 |
| 2,331,144 | Sitter | Oct. 5, 1943 |
| 2,424,288 | Severy | July 22, 1947 |
| 2,493,755 | Ferrill | Jan. 10, 1950 |
| 2,513,868 | Hill | July 4, 1950 |

FOREIGN PATENTS

| Number | Country | Date |
|---|---|---|
| 528,174 | Great Britain | Oct. 24, 1940 |
| 549,674 | Great Britain | Dec. 2, 1942 |